April 12, 1932. W. W. DE LANEY 1,853,894
METHOD OF MAKING BATHING CAPS AND THE LIKE
Filed April 22, 1931 2 Sheets-Sheet 1

Inventor
Wallace W. De Laney
By Rockwell + Bartholow
Attorneys

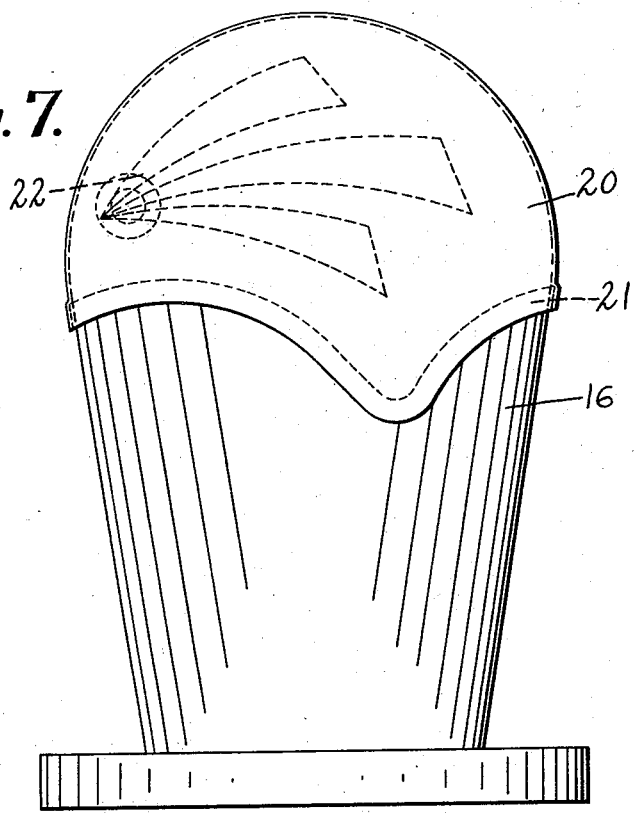
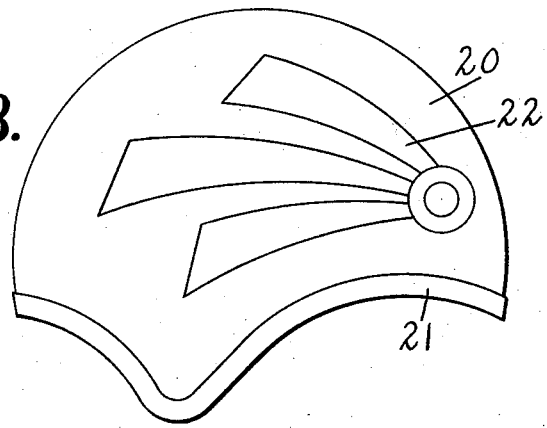

Patented Apr. 12, 1932

1,853,894

UNITED STATES PATENT OFFICE

WALLACE W. DE LANEY, OF NEW HAVEN, CONNECTICUT, ASSIGNOR TO THE SEAMLESS RUBBER COMPANY, INCORPORATED, OF NEW HAVEN, CONNECTICUT

METHOD OF MAKING BATHING CAPS AND THE LIKE

Application filed April 22, 1931. Serial No. 531,991.

This invention relates to the manufacture of hollow rubber articles such as bathing caps or the like, and more particularly to a method of manufacture of such articles whereby they may be given the desired form and shape during the manufacture thereof, and not be made in merely flat condition so that considerable stretching of certain parts of the article is necessary when it is used. For instance, in the manufacture of bathing caps for example, it is quite common to make the caps of flat or sheet stock, the stock being cut to the desired shape so that each piece constitutes one-half of the cap. These two pieces are secured together and the cap is then banded and trimmed and the rubber is cured to complete the operation. The resulting cap is not formed, but on the contrary will lie substantially flat, the two halves abutting each other. When such a cap is worn, it will be obvious that considerable stretching of certain portions thereof is required, as a result of which the cap may be more or less tight and uncomfortable.

In some instances formed or round caps have been made, but these are usually molded. In this process the rubber stock is placed in the mold in two or more pieces and a core is used about which the parts of the cap are assembled, the core giving to the completed article its hollow, round shape as distinguished from the flat shape which results from what may be termed the mechanical process described above. The molded caps are, however, more or less heavy and stretch less easily than those of the unmolded type so that they possess certain undesirable qualities.

One object of this invention is the provision of a method of manufacture of fashioned or formed hollow rubber articles which will possess the advantages of the unmolded or mechanically made articles and at the same time will be given the desired shape or form which has, in the past, been obtainable only by molding.

Another object of the present invention is the provision of a light, full-fashioned or round bathing cap manufactured from sheet rubber stock so that it will be light and very elastic and at the same time may be economically produced.

A still further object of the invention is the provision of a method of making hollow rubber articles such as bathing caps wherein the article may be first made of uncured sheet rubber stock, fashioned to shape by being fitted to a form made for the purpose and then cured upon the form so that, in the case of a bathing cap, a light economical article is produced which may be worn with great comfort, and which is of the desired shape to fit the head of the wearer.

A still further object of the invention is the provision of a method of making bathing caps and particularly ornamented bathing caps wherein the caps are first made of uncured rubber stock, the ornaments secured thereto and the cap placed inside out upon a form with the right side next to the form and cured on the form in this position.

To these and other ends, the invention consists in the novel features and combinations of steps to be hereinafter described and claimed.

In the accompanying drawings:

Fig. 7 is a view of an ornamented cap placed inside out upon the form in position for curing, and Fig. 8 is a side elevational view of the completed cap shown in Fig. 7.

Figure 1:
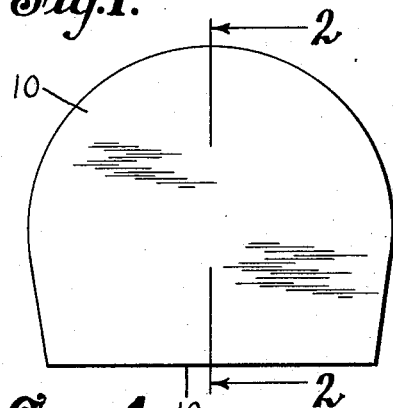
Fig. 1 is a view of a bathing cap blanked out from sheet rubber stock.

While I have chosen to illustrate a preferred application of the present method to the manufacture of bathing caps, it will be understood that the novel features of the invention may be employed in the manufacture of other hollow rubber articles as well.

In the manufacture of the bathing cap illustrated in the drawings, the raw or unvulcanized rubber, as it comes in somewhat rough sheets, is passed through a calender so that the stock may be reduced to sheets of the desired and uniform thickness. These sheets are usually run off from the calenders in rolls.

In the present method the stock is cut into pieces from the rolls and the pieces are piled up and left in piles to shrink on trays. A form or pattern is then placed upon these piles and an electric knife is run about the pattern to cut the stock in the piles to the desired shape shown in Fig. 1 at 10. The blank 10 represents, of course, one-half of the material to be used in making the cap, and as shown in Fig. 2, the second half 11 lies immediately below the upper half 10. It will, of course, be understood that the cap may be made of more than two pieces if desired, but I have shown a two-piece cap as merely illustrative of the improved method.

Figure 2:
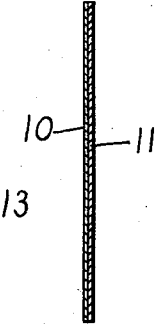
Fig. 2 is a cross-sectional view on line 2—2 of Fig. 1.
Figure 3:
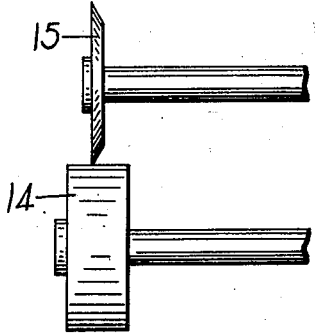
Fig. 3 is a view showing the seaming rolls used to secure the two halves of the blanked cap together.

With reference to Fig. 1, the bottom of the cap 12 will be left open, but the edge 13 will be entirely closed. The closing of the edge 13 is accomplished by means of what is known as a seaming cutter consisting of the rolls 14 and 15 shown in Fig. 3. The cutting roll 15, as is shown, is beveled to cut the edges 13 of the blanks 10 and 11 and seam them together in a well-known manner.

Figure 4:
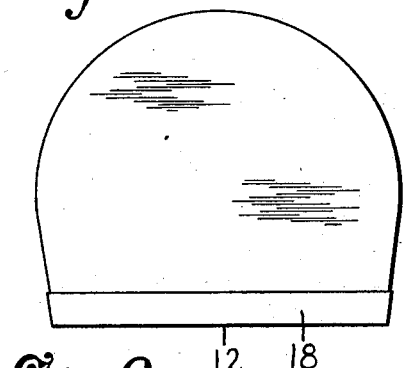
Fig. 4 is a view of the cap after it has been seamed and banded.

The band 18 shown in Fig. 4 is placed about the cap at this time, and any trimming which is desired to be done before the curing of the cap may also be performed. The cap is now ready to be placed upon a proper form for curing.

Figure 5:
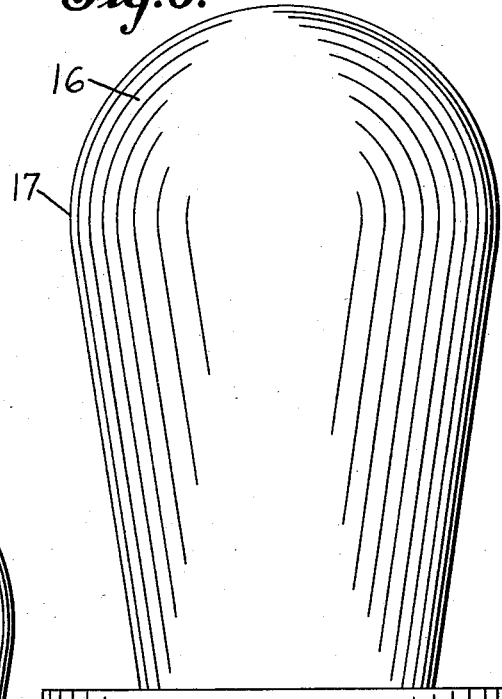
Fig. 5 is a view of the form upon which the cap is mounted and fitted to be cured.

The resulting article is a flat hollow cap which is closed except at the bottom edge 12. This cap is then placed over the form 16 shown in Fig. 5 after it has been well dusted so that it may be placed on the form with comparative facility. It will be seen that adjacent its upper end, particularly at about the portion designated by the character 17, the form is of larger diameter than it is below this point, and it will also be understood that the form is of substantially circular shape in horizontal cross-section. It will be apparent, therefore, that when the cap is slipped over the form, it will be necessary for the open end thereof to be stretched to some extent to go over the large part of the form. The rubber is at this time in uncured condition and, as is well-known, rubber in such condition lacks elasticity in that it will not return to shape after having been stretched. The natural inference would be, therefore, that the cap in this condition could not be made to fit the form perfectly but particularly at the lower edges would hang loosely about the surface of the form after it had been stretched to pass over the largest portion thereof.

I have found, however, that by pressure from the hands of the operator and by working or kneading the cap and pressing it against the form, it can be made to fit the form accurately and smoothly at all points. It will, if treated in this manner, shape itself to the form to such an extent that it is not necessary for it to be glued or secured thereupon during the curing operation.

The curing is accomplished while the cap is upon the form 16 and may be carried out by means of a dry heater or a steam vulcanizer, or by any other suitable method such for example as an acid curing. For instance, the forms 16 with the caps thereon may be placed in a vulcanizer and heat applied to effect the proper curing of the raw rubber.

Figure 6:
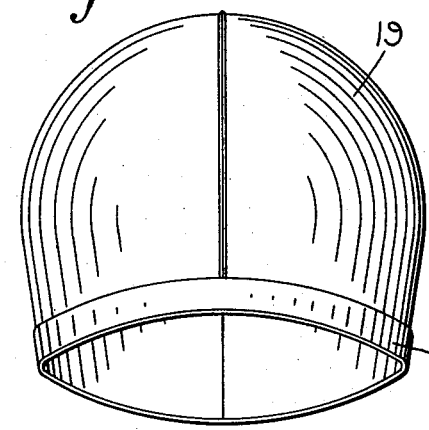
Fig. 6 is a view of the completed cap.

The completed cap shown at 19 in Fig. 6 can then be readily removed from the form after the cure has been completed. It will be apparent that this cap will retain the shape given it upon the form, and will be round or full-fashioned, and not lie flat as it was in the uncured condition before being placed upon the form 16.

While it may be said that the cap is molded to shape upon the form 16 by pressure from the hands, I do not use this term in the sense in which it is often used, that is, to refer to articles being shaped or formed by the walls of a mold. As used herein the term molded merely refers to the shaping or forming of the article by pressure against the form 16.

In the foregoing description it has been assumed that the cap will be placed upon the form right side out. This, of course, will result in the right side of the cap being exposed to the air or steam when the curing operation is performed in a dry heater or steam vulcanizer. This sometimes results in the surface of the cap being dull in color so that a subsequent polishing operation is required before marketing.

I have, therefore, found it advantageous in some instances to cure the cap upon the form inside out, as illustrated in Figs. 7 and 8 of the drawings. In Fig. 7 I have shown upon the form 16 a cap 20 placed upon the form inside out. It will, of course, be understood that this cap is stretched over the form and molded thereupon by manual pressure as has previously been described in Figs. 1 to 6 of the drawings. The cap 20 is provided with the band 21 and with an ornament comprising the figured portion 22. In this case the ornament 22 consists of separate pieces of rubber preferably of a different color from that of the body of the cap placed thereupon.

After the cap has been formed as previously described, but before it is placed upon the form for curing, the pieces forming the design are pressed onto the outside surface which has been previously wiped with naphtha or a similar substance. The cap is then placed upon the form inside out and the pressure of the cap upon the form will hold the ornamental parts in position during the vulcanizing process. After the vulcanizing has been completed, it will be found that the ornamental pieces are secured firmly in place so that it will be apparent that the feature of placing the caps inside out upon the form has a particular advantage in connection with caps of this character.

A still further advantage in this method of curing the caps lies in the fact that, when the right or embossed side of the cap is placed next to the form, there is less likelihood of air being trapped between the cap and the form. It will, of course, be appreciated that if any air is so trapped it will expand during the vulcanizing operation and cause the rubber to "blow".

It will, of course, be understood that whether the cap is cured right side out or inside out upon the form, it is not contemplated to use in the method here shown any complemental outside form, the only one being used being the form 16 upon which the caps are stretched.

While I have shown and described some preferred embodiments of my invention, it will be understood that it is not to be limited to all of the details shown but is capable of modification and variation within the spirit of the invention and within the scope of the appended claims. The present application is a continuation in part of my prior application, Serial No. 504,335, filed December 23, 1930.

What I claim is:

1. The method of making hollow rubber articles which comprises preparing from uncured sheet rubber stock a hollow article open at one end, placing this article upon a rigid form inside out, molding the article about the form by manual pressure, and then curing the article upon the form.

2. The method of making a bathing cap or the like which comprises making the blank cap of uncured rubber stock, placing the blank over a rigid form with the right side of the cap next to the surface of the form, fashioning the blank to fit the form tightly and smoothly by manual pressure on the blank when it is over the form, and then curing the cap upon the form.

3. The method of making a fashioned and ornamented bathing cap which comprises making a flat blank cap open at one end of uncured sheet rubber stock, placing ornamental pieces upon the outer surface of the blank, stretching the blank cap over a rounded form with the right and ornamented side of the cap adjacent the surface of the form whereby pressure of the cap upon the form tends to hold the ornaments in position, holding the blank to fit the form tightly and smoothly by manual pressure on the blank, and then curing the cap upon the form whereby the ornamental parts are caused to adhere tightly thereto and the right surface of the cap next to the form is given a bright lustrous finish.

4. The method of making a bathing cap or the like which comprises making a blank cap from uncured sheet rubber stock, stretching the blank over a rigid convex form with the right side of the cap next to the surface of the form, and curing said cap upon the form with its outer or wrong surface exposed.

5. The method of making a bathing cap or the like which comprises making a blank cap of uncured sheet rubber stock, securing upon the outer or right surface of the blank ornamental or trimming members, placing the blank inside out upon a rigid convex form whereby the ornamental or trimming members are pressed against the cap by the form, and curing the cap upon the form with the outer or wrong surface exposed.

In witness whereof, I have hereunto set my hand this 20th day of April, 1931.

WALLACE W. DE LANEY.

CERTIFICATE OF CORRECTION.

Patent No. 1,853,894. Granted April 12, 1932, to

WALLACE W. DE LANEY.

It is hereby certified that error appears in the printed specification of the above numbered patent requiring correction as follows: Page 3, lines 60 and 61, claim 3, for "holding" read molding; and that the said Letters Patent should be read with this correction therein that the same may conform to the record of the case in the Patent Office.

Signed and sealed this 31st day of May, A. D. 1932.

(Seal)

M. J. Moore,
Acting Commissioner of Patents.